United States Patent
Alsup (10) Patent No.: US 7,073,026 B2
(45) Date of Patent: Jul. 4, 2006

(54) MICROPROCESSOR INCLUDING CACHE MEMORY SUPPORTING MULTIPLE ACCESSES PER CYCLE

(75) Inventor: Mitchell Alsup, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 522 days.

(21) Appl. No.: 10/304,605

(22) Filed: Nov. 26, 2002

(65) Prior Publication Data
US 2004/0103250 A1    May 27, 2004

(51) Int. Cl.
*G06F 12/00* (2006.01)
(52) U.S. Cl. ............................ 711/118; 711/3; 711/144; 711/106; 711/147; 711/131; 711/140; 711/150; 711/154; 711/170
(58) Field of Classification Search .................. 711/3, 711/144, 106, 118, 147, 131, 140, 150, 154, 711/170
See application file for complete search history.

(56) References Cited

U.S. PATENT DOCUMENTS

| | | | |
|---|---|---|---|
| 5,559,986 A * | 9/1996 | Alpert et al. | 711/144 |
| 5,598,550 A * | 1/1997 | Shen et al. | 711/146 |
| 6,237,064 B1 | 5/2001 | Kumar et al. | |
| 6,427,191 B1 | 7/2002 | Fu et al. | |
| 6,574,708 B1 * | 6/2003 | Hayter et al. | 711/118 |
| 6,965,969 B1 * | 11/2005 | Burger et al. | 711/128 |
| 2002/0056022 A1 * | 5/2002 | Leung | 711/106 |

FOREIGN PATENT DOCUMENTS

| | | |
|---|---|---|
| EP | 840 231 | 5/1998 |
| EP | 848 331 | 6/1998 |
| WO | 98/13763 | 4/1998 |

* cited by examiner

*Primary Examiner*—Mano Padmanabhan
*Assistant Examiner*—Mardochee Chery
(74) *Attorney, Agent, or Firm*—Robert C. Kowert; Meyertons, Hood, Kivlin, Kowert & Goetzel, P.C.

(57) ABSTRACT

A microprocessor including a level two cache memory which supports multiple accesses per cycle. The microprocessor includes an execution unit coupled to a cache memory subsystem which includes a cache memory coupled to a plurality of buses. The cache memory includes a plurality of independently accessible storage blocks. The buses may be coupled to convey a plurality of cache access requests to each of the storage blocks. In response to the plurality of cache access requests being conveyed on the plurality of cache buses, different ones of the storage blocks are concurrently accessible.

51 Claims, 7 Drawing Sheets

MICROPROCESSOR INCLUDING CACHE MEMORY SUPPORTING MULTIPLE ACCESSES PER CYCLE

BACKGROUND OF THE INVENTION

1. Field of the Invention

This invention relates to the field of microprocessors and, more particularly, to cache memory management within a microprocessor.

2. Description of the Related Art

Typical computer systems may contain one or more microprocessors which may be coupled to one or more system memories. The processors may execute code and operate on data that is stored within the system memories. It is noted that as used herein, the term "processor" is synonymous with the term microprocessor. To facilitate the fetching and storing of instructions and data, a processor typically employs some type of memory system. In addition, to expedite accesses to the system memory, one or more cache memories may be included in the memory system. For example, some microprocessors may be implemented with one or more levels of cache memory. In a typical microprocessor, a level one (L1) cache and a level two (L2) cache may be used, while some newer processors may also use a level three (L3) cache. In many legacy processors, the L1 cache may reside on-chip and the L2 cache may reside off-chip. However, to further improve memory access times, newer processors may use an on-chip L2 cache.

Generally speaking, the L2 cache may be larger and slower than the L1 cache. In addition, the L2 cache is often implemented as a unified cache, while the L1 cache may be implemented as a separate instruction cache and a data cache. The L1 data cache is used to hold the data most recently read or written by the software running on the microprocessor. The L1 instruction cache is similar to L1 data cache except that it holds the instructions executed most recently. It is noted that for convenience the L1 instruction cache and the L1 data cache may be referred to simply as the L1 cache, as appropriate. The L2 cache may be used to hold instructions and data that do not fit in the L1 cache. The L2 cache may be exclusive (e.g., it stores information that is not in the L1 cache) or it may be inclusive (e.g., it stores a copy of the information that is in the L1 cache).

Memory systems typically use some type of cache coherence mechanism to ensure that accurate data is supplied to a requester. The cache coherence mechanism typically uses the size of the data transferred in a single request as the unit of coherence. The unit of coherence is commonly referred to as a cache line. In some processors, for example, a given cache line may be 64 bytes, while some other processors employ a cache line of 32 bytes. In yet other processors, other numbers of bytes may be included in a single cache line. If a request misses in the L1 and L2 caches, an entire cache line of multiple words is transferred from main memory to the L2 and L1 caches, even though only one word may have been requested. Similarly, if a request for a word misses in the L1 cache but hits in the L2 cache, the entire L2 cache line including the requested word is transferred from the L2 cache to the L1 cache. Thus, a request for unit of data less than a respective cache line may cause an entire cache line to be transferred between the L2 cache and the L1 cache. Such transfers typically require multiple cycles to complete.

During a read or write to cacheable memory, the L1 cache is first checked to see if the requested information (e.g., instruction or data) is available. If the information is available, a hit occurs. If the information is not available, a miss occurs. If a miss occurs, then the L2 cache may be checked. Thus, when a miss occurs in the L1 cache but hits within, L2 cache, the information may be transferred from the L2 cache to the L1 cache. As described below, the amount of information transferred between the L2 and the L1 caches is typically a cache line. In addition, depending on the space available in L1 cache, a cache line may be evicted from the L1 cache to make room for the new cache line and may be subsequently stored in L2 cache. Modem processors may have optimized cache data transfers by performing multiple of these data transfers. In some conventional processors, during these cache line "swaps," no other accesses to either the L1 cache or the L2 cache may be processed.

SUMMARY OF THE INVENTION

Various embodiments of a microprocessor including a level two cache memory which supports multiple accesses per cycle are disclosed. In one embodiment, a microprocessor includes an execution unit coupled to a cache memory subsystem which includes a cache memory coupled to a plurality of buses. The cache memory includes a plurality of independently accessible storage blocks. The buses may be coupled to convey a plurality of cache access requests to each of the storage blocks. In response to the plurality of cache access requests being conveyed on the plurality of cache buses, different ones of the storage blocks are concurrently accessible.

In one implementation, the cache memory may include a plurality of independently accessible tag units coupled to the plurality of storage blocks and configured to store a plurality of tags each including an address tag value. In response to receiving the plurality of cache access requests, different ones of the plurality of tag units are concurrently accessible.

In another implementation, each of the plurality of storage blocks includes a plurality of independently accessible storage sub-blocks. Any two of the sub-blocks associated with different ones of the storage blocks may be concurrently accessible. Further, any two of the sub-blocks associated with the same storage block may be accessible in successive sequential cycles.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1:
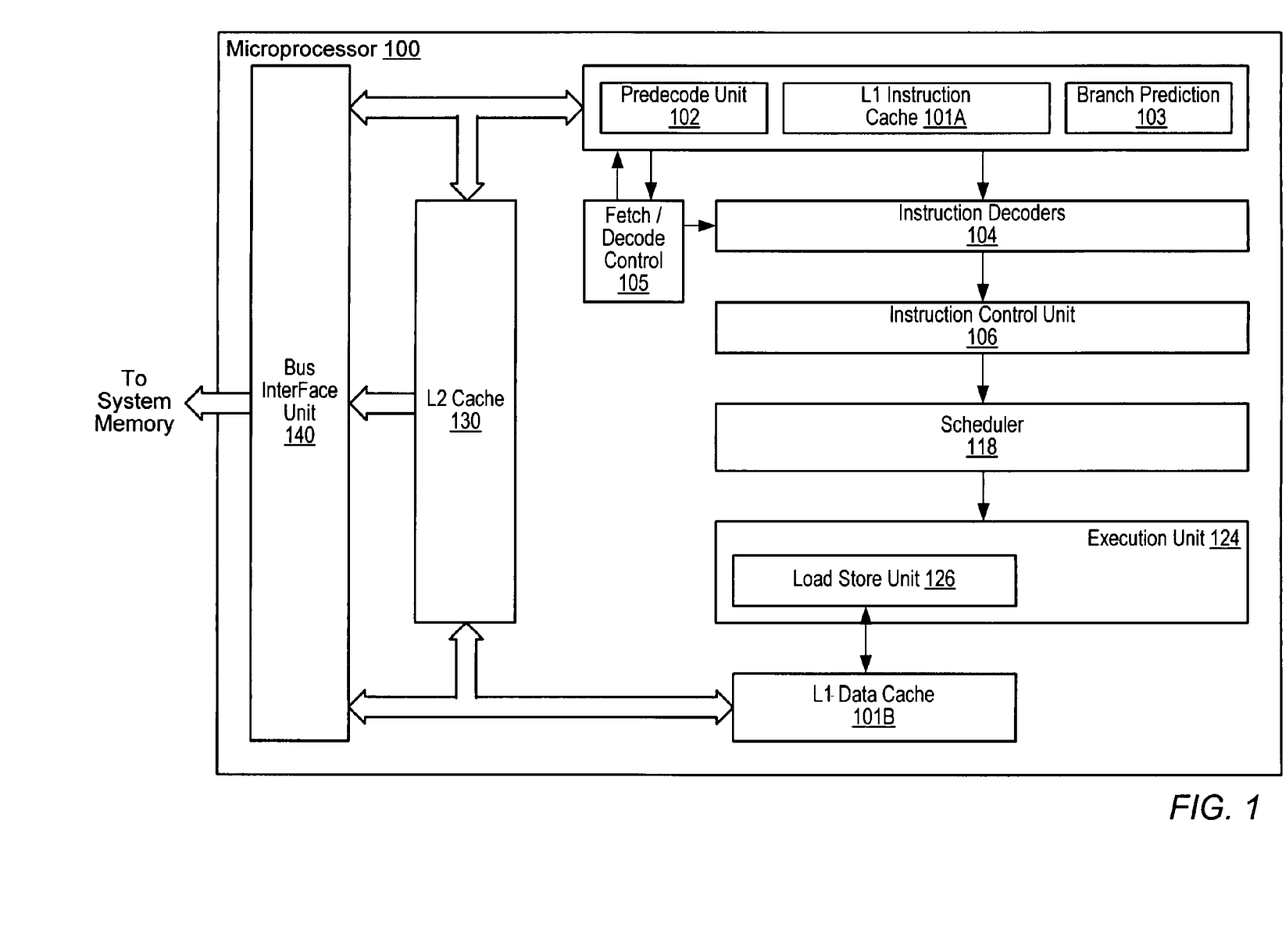
FIG. 1 a block diagram of one embodiment of a microprocessor.

Turning now to FIG. 1, a block diagram of one embodiment of an exemplary microprocessor 100 is shown. Microprocessor 100 is configured to execute instructions stored in a system memory (not shown). Many of these instructions operate on data stored in the system memory. It is noted that the system memory may be physically distributed throughout a computer system and may be accessed by one or more microprocessors such as microprocessor 100, for example. In one embodiment, microprocessor 100 is an example of a microprocessor which implements the x86 architecture such as an Athlon™ processor, for example. However, other embodiments are contemplated which include other types of microprocessors.

In the illustrated embodiment, microprocessor 100 includes a first level one (L1) cache and a second L1 cache: an instruction cache 101A and a data cache 101B. Depending upon the implementation, the L1 cache may be a unified cache or a bifurcated cache. In either case, for simplicity, instruction cache 101A and data cache 101B may be collectively referred to as L1 cache where appropriate. Microprocessor 100 also includes a pre-decode unit 102 and branch prediction logic 103 which may be closely coupled with instruction cache 101A. Microprocessor 100 also includes a fetch and decode control unit 105 which is coupled to an instruction decoder 104; both of which are coupled to instruction cache 101A. An instruction control unit 106 may be coupled to receive instructions from instruction decoder 104 and to dispatch operations to a scheduler 118. Scheduler 118 is coupled to receive dispatched operations from instruction control unit 106 and to issue operations to execution unit 124. Execution unit 124 includes a load/store unit 126 which may be configured to perform accesses to data cache 101B. Results generated by execution unit 124 may be used as operand values for subsequently issued instructions and/or stored to a register file (not shown). Further, microprocessor 100 includes an on-chip L2 cache 130 which is coupled between instruction cache 101A, data cache 101B and the system memory.

Instruction cache 101A may store instructions before execution. Functions which may be associated with instruction cache 101A may be instruction fetching (reads), instruction pre-fetching, instruction pre-decoding and branch prediction. Instruction code may be provided to instruction cache 106 by pre-fetching code from the system memory through buffer interface unit 140 or as will be described further below, from L2 cache 130. Instruction cache 101A may be implemented in various configurations (e.g., set-associative, fully-associative, or direct-mapped). In one embodiment, instruction cache 101A may be configured to store a plurality of cache lines where the number of bytes within a given cache line of instruction cache 101A is implementation specific. Further, in one embodiment instruction cache 101A may be implemented in static random access memory (SRAM), although other embodiments are contemplated which may include other types of memory. It is noted that in one embodiment, instruction cache 101A may include control circuitry (not shown) for controlling cache line fills, replacements, and coherency, for example.

Instruction decoder 104 may be configured to decode instructions into operations which may be either directly decoded or indirectly decoded using operations stored within an on-chip read-only memory (ROM) commonly referred to as a microcode ROM or MROM (not shown). Instruction decoder 104 may decode certain instructions into operations executable within execution unit 124. Simple instructions may correspond to a single operation. In some embodiments, more complex instructions may correspond to multiple operations.

Instruction control unit 106 may control dispatching of operations to the execution unit 124. In one embodiment, instruction control unit 106 may include a reorder buffer for holding operations received from instruction decoder 104. Further, instruction control unit 106 may be configured to control the retirement of operations.

The operations and immediate data provided at the outputs of instruction control unit 106 may be routed to scheduler 118. Scheduler 118 may include one or more scheduler units (e.g. an integer scheduler unit and a floating point scheduler unit). It is noted that as used herein, a scheduler is a device that detects when operations are ready for execution and issues ready operations to one or more execution units. For example, a reservation station may be a scheduler. Each scheduler 118 may be capable of holding operation information (e.g., bit encoded execution bits as well as operand values, operand tags, and/or immediate data) for several pending operations awaiting issue to an execution unit 124. In some embodiments, each scheduler 118 may not provide operand value storage. Instead, each scheduler may monitor issued operations and results available in a register file in order to determine when operand values will be available to be read by execution unit 124. In some embodiments, each scheduler 118 may be associated with a dedicated one of execution unit 124. In other embodiments, a single scheduler 118 may issue operations to more than one of execution unit 124.

In one embodiment, execution unit 124 may include an execution unit such as and integer execution unit, for example. However in other embodiments, microprocessor 100 may be a superscalar processor, in which case execution unit 124 may include multiple execution units (e.g., a plurality of integer execution units (not shown)) configured to perform integer arithmetic operations of addition and subtraction, as well as shifts, rotates, logical operations, and branch operations. In addition, one or more floating-point units (not shown) may also be included to accommodate floating-point operations. One or more of the execution units may be configured to perform address generation for load and store memory operations to be performed by load/store unit 126.

Load/store unit 126 may be configured to provide an interface between execution unit 124 and data cache 101B. In one embodiment, load/store unit 126 may be configured with a load/store buffer (not shown) with several storage locations for data and address information for pending loads or stores. The load/store unit 126 may also perform dependency checking on older load instructions against younger store instructions to ensure that data coherency is maintained.

Data cache 101B is a cache memory provided to store data being transferred between load/store unit 126 and the system memory. Similar to instruction cache 101A described above, data cache 101B may be implemented in a variety of specific memory configurations, including a set associative configuration. In one embodiment, data cache 101B and instruction cache 101A are implemented as separate cache units. Although as described above, alternative embodiments are contemplated in which data cache 101B and instruction cache 101A may be implemented as a unified cache. In one embodiment, data cache 101B may store a plurality of cache lines where the number of bytes within a given cache line of data cache 101B is implementation specific. Similar to instruction cache 101A, in one embodiment data cache 101B may also be implemented in static random access memory (SRAM), although other embodiments are contemplated which may include other types of memory. It is noted that in one embodiment, data cache 101B may include control circuitry (not shown) for controlling cache line fills, replacements, and coherency, for example.

L2 cache 130 is also a cache memory and it may be configured to store instructions and/or data. In the illustrated embodiment, L2 cache 130 may be an on-chip cache and may be configured as either fully associative or set associative or a combination of both. In one embodiment, L2 cache 130 may store a plurality of cache lines. It is noted that L2 cache 130 may include control circuitry (not shown in FIG. 1) for controlling cache line fills, replacements, and coherency, for example.

As will be described in greater detail below in conjunction with the description of FIG. 4, in one embodiment, a portion of L2 cache 130 (e.g., a main cache storage array portion of L2 cache 130) may be asynchronously accessed, while another portion of L2 cache 130 (e.g., an L2 cache 130 tag array corresponding to the main array) may be accessed synchronously and in a fully pipelined manner. In addition, the main storage array cells may be arranged in a plurality of independently accessible storage blocks or units of memory which may be accessed concurrently with other storage blocks.

Bus interface unit 140 may be configured to transfer instructions and data between system memory and L2 cache 130 and between system memory and L1 instruction cache 101A and L1 data cache 101B. In one embodiment, bus interface unit 140 may include buffers (not shown) for buffering write transactions during write cycle streamlining.

Figure 2:
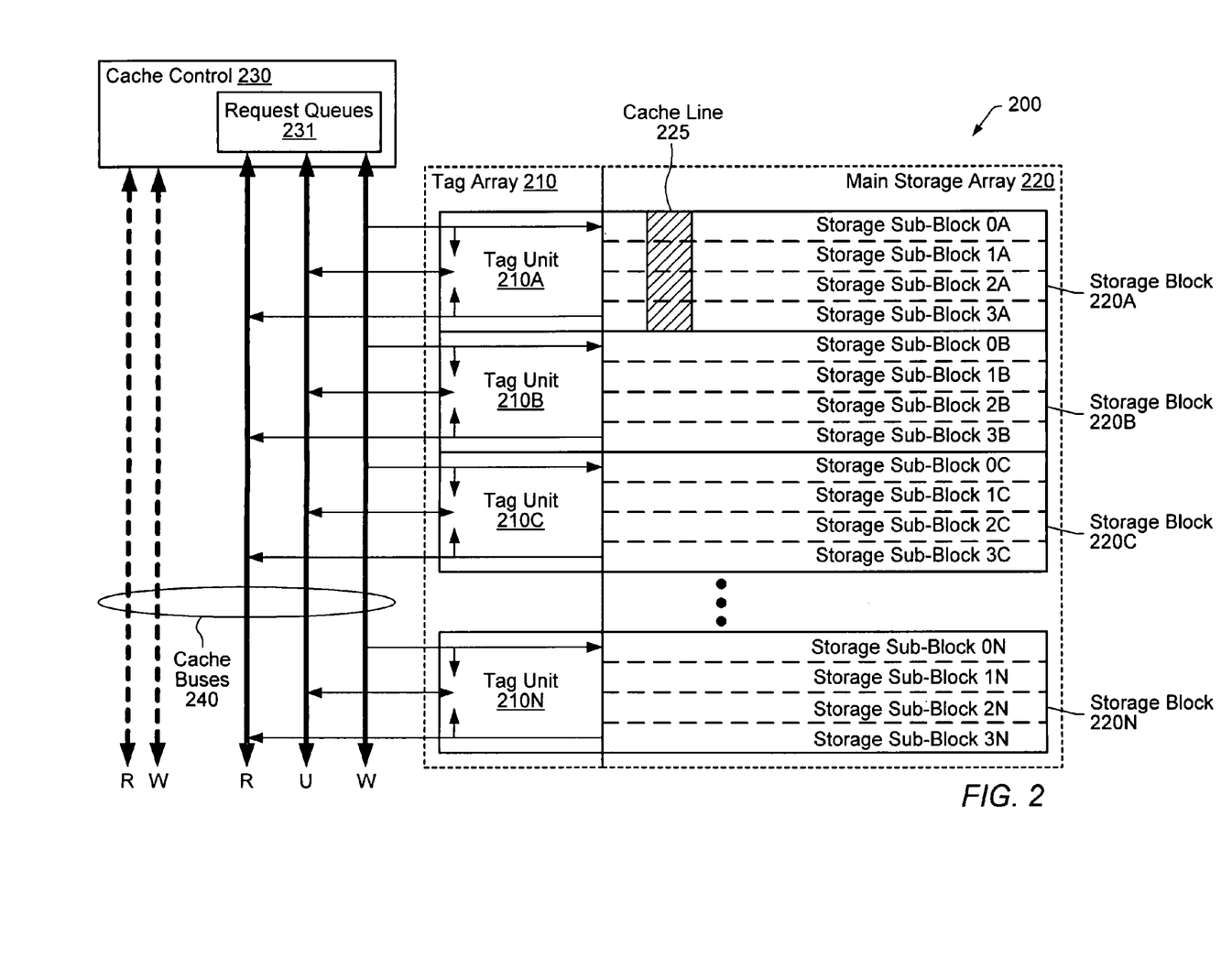
FIG. 2 is a block diagram of one embodiment of a cache subsystem of the microprocessor of FIG. 1.

Referring to FIG. 2, a block diagram of one embodiment of a cache subsystem of the microprocessor of FIG. 1 is shown. Cache subsystem 200 includes a cache memory including a main storage array 220 coupled to a tag array 210. Further, cache subsystem 200 includes a cache control 230 which is coupled to tag array 210 via a plurality of buses designated cache buses 240. In one embodiment, main storage array 220 and tag array 210 may be used in an L2 cache subsystem such as L2 cache 130 of FIG. 1, for example. It is noted however, that in other embodiments, main storage array 220 and tag array 210 may be used in any cache subsystem.

Main storage array 220 includes a plurality of memory units which are arranged into independently accessible storage blocks. In the illustrated embodiment, the storage blocks are designated 220A–220N, where N may be any number of blocks. In one embodiment there may be eight such storage blocks, although in other embodiments other numbers of blocks are contemplated. In addition, each of storage blocks 220A–N includes four independently accessible storage sub-blocks, designated sub-blocks 0–3. It is noted that although each of storage blocks 220A–N includes four such sub-blocks, it is contemplated that in other embodiments each of storage blocks 220A–N may include other numbers of sub-blocks.

Tag array 210 is a storage array configured to store cache line tag information. The address information in a tag is used to determine if a given piece of data is present in the cache during a memory request. For example, a memory request includes an address of the requested data. Compare logic (not shown) within tag array 210 compares the requested address with the address information within each tag stored within a given tag unit 210A–N of tag array 210. If there is a match between the requested address and an address associated with a given tag, a hit is indicated as described above. If there is no matching tag, a miss is indicated. Tag array 210 is arranged into a plurality of tag units, designated 210A–210N, where N is any number of tag units. Each of tag units 210A–N corresponds to one of the independently accessible storage blocks and may include a plurality of tag elements. For example, in the illustrated embodiment, tag unit 210A corresponds to storage block 220A. In addition, each tag element within a given tag unit may correspond to all the storage sub-blocks in a given storage block. A tag entry stores a portion of an address of a piece of data stored within storage array 220. Other portions of the address may specify the location (i.e., the sub-block) within the storage array 220 to be accessed. A cache line may be stored within a given storage block such that the cache line spans all four storage sub-blocks. For example, in the illustrated embodiment, cache line 225 is stored across storage sub-blocks 0–3 of storage block 220A with one sub-line stored within each sub-block.

Cache control 230 may include one or more request queues 231 and control logic (not shown) which may be configured to store incoming cache requests and to select and schedule those requests for conveyance on cache buses 240. Request queues 231 may correspond to the sources and/or types of received cache requests (described below). In one embodiment, cache control 230 may receive requests from such sources as cache misses from L1 instruction cache 101A or L1 data cache 101B, both of FIG. 1. Further, cache control 230 may receive requests from bus interface unit 140 or from another processor (not shown) in the form of a snoop request.

Generally speaking, cache requests may come in the form of a read request, a write request or an update request. In the illustrated embodiment, to accommodate these requests, cache buses 240 include a read bus (R), a write bus (W) and an update bus (U). Although other embodiments are contemplated which may include any number of each type of bus. For example, additional buses (indicated by dotted lines) may be used in alternative embodiments. Cache control 230 is coupled to tag array 210 and main storage array 220 via cache buses 240. The read bus R and write bus W are coupled through to main storage array 220, while the update bus U may be coupled only to tag array 210. In one embodiment, the R bus may include signal paths for conveying address and control information to tag array 210 and main storage array 220 and for conveying data from main storage array 220. The W bus may include signal paths for conveying address and control information to tag array 210 and main storage array 220 and for conveying data to main storage array 220. The U bus may include signal paths for conveying address and control information to tag array 210.

In one embodiment, a cache update may modify information within a tag element of a given tag unit such as tag unit 210A, for example. The information may include changing the state of a particular cache line. For example, in one embodiment, a memory subsystem may employ a modified, owned, exclusive, shared, invalid (MOESI) coherency protocol. In such an embodiment, a requester may write a new cache line state to tag array 210 without changing the data stored in a corresponding location main storage array 220. A cache line read request which hits in tag array 210 may cause the data stored within a corresponding location in main storage array 220 to be conveyed upon read bus R. Similarly, a cache line write request which hits in tag array 210 may cause write data to be conveyed upon write bus W and be written into main storage array 220.

As described above, each of tag units 210A–N and each of storage blocks 220A–N are independently accessible. In addition, since the R, W and U buses of cache buses 240 are coupled to each tag unit 210A–N and the R and W buses are coupled to each storage block 220A–N, depending upon the type of cache request (e.g., read, write or update), tag units 210A–N and storage blocks 220A–N may be accessed concurrently (e.g., during the same cycle). Thus in the illustrated embodiment, up to three independent access requests to different tag units may be serviced concurrently. For example, a read request for tag unit 210B may be serviced concurrently with a write request for tag unit 210A which may be serviced concurrently with an update request for tag unit 210C. It is noted that in embodiments having more buses coupled to tag array 210 and main storage array 220, it is contemplated that more concurrent requests may be serviced.

Each of tag units 210A–N may be assigned a unique address value. This unique address value may correspond to a portion of an address and may be referred to as the block bit portion of the address. When an incoming request includes an address value having block bits which match a given tag unit's unique assigned value, the request is for that tag unit. In one embodiment, each of tag units 210A–N may monitor the R, W and U buses of cache buses 240. If multiple requests (e.g., R, W, U) are presented on the R, W and U buses of cache buses 240 in a given cycle and two or more of the requests are for the same tag unit, that tag unit may select one of the requests for that cycle. The other requests for that tag unit are rejected for that cycle. However, the rejected conflicting requests may be selected in subsequent cycles. In one embodiment, tag unit selection logic (not shown) may choose the requests such that updates have the highest priority followed by reads, followed by writes. It is noted that alternative embodiments are contemplated which may use different priorities to select reads, writes and updates when multiple requests are presented on the R, W and U buses of cache buses 240 in a given cycle and two or more of the requests are for the same tag unit.

As described above, cache control 230 may include one or more request queues 231 in which to store incoming cache requests. In one embodiment, cache control 230 may include logic (not shown) which may be configured to select three requests (e.g., read, write and update) from request queues 231 and to cause the selected requests to be conveyed upon respective R, W and U buses of cache buses 240 during each cache access cycle. Cache control 230 may select one read and one write request without checking whether they may conflict on the same tag unit. In such an embodiment, if the requests conflict, the tag unit may select and reject the requests as described above. In another embodiment, cache control 230 may select a write request based upon a selected read request address tag such that there may be no conflict at a given tag unit. If an update request is present, it may be selected without checking for a tag unit conflict. In another embodiment, cache control 230 may select the read and write requests such that if there exists a pair of read and write requests that do not conflict, that pair may always be chosen. For example, if a read and a write request both have the block bits, cache control 230 may send the two conflicting requests during different cycles, thereby possibly sending requests with no conflicts. In addition, an embodiment is contemplated in which cache control 230 may also verify that a given storage block or sub-block is not busy prior to selecting a read or write request.

Thus, depending on the type and number of cache access to tag array 210, multiple accesses to different storage blocks may be serviced concurrently. Further and as will be described in greater detail below in conjunction with the description of FIG. 3, access to tag array 210 may be fully pipelined such that multiple accesses to any one storage block, but different sub-blocks, of main storage array 220 may be serviced in subsequent sequential cycles. A subsequent access to a busy sub-block of main storage array 220 may be delayed until the sub-block is no longer busy.

Figure 3:
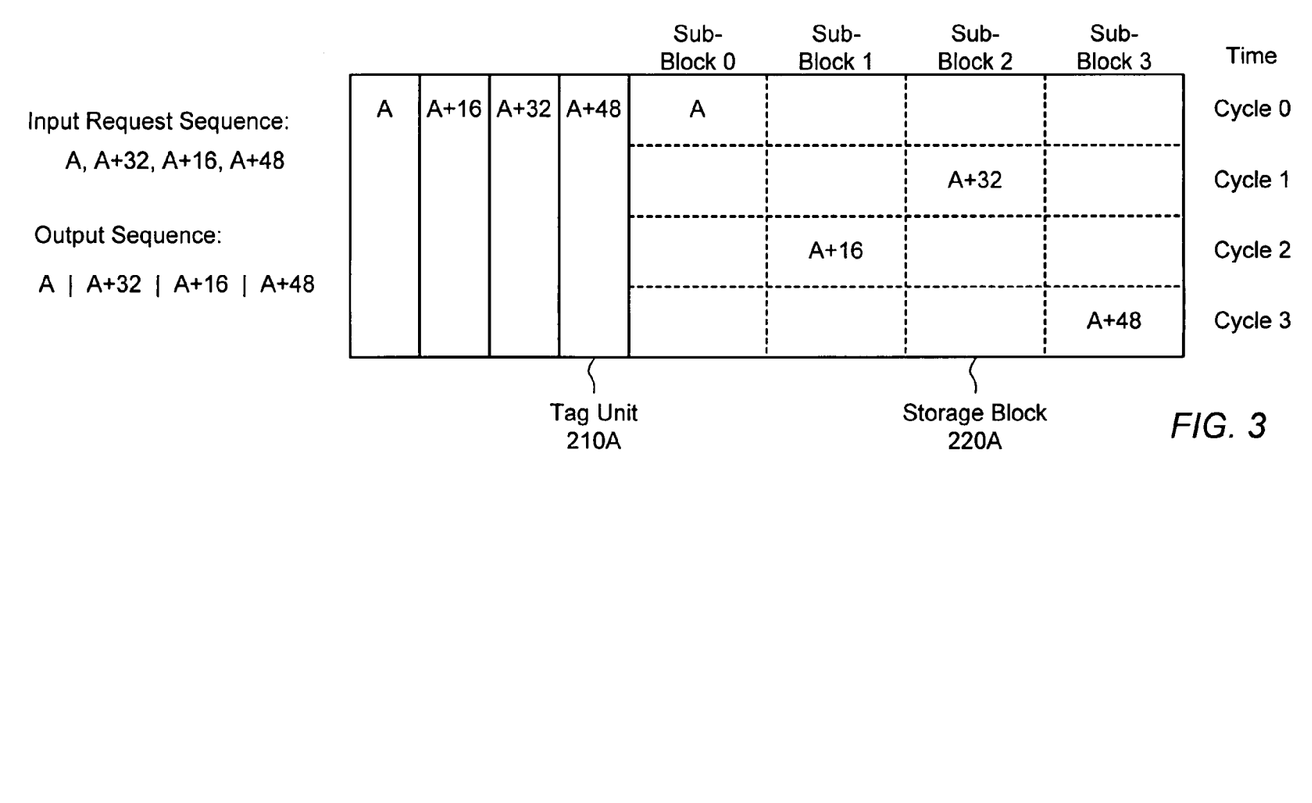
FIG. 3 is a diagram illustrating an access sequence to one embodiment of a storage block of the cache subsystem of FIG. 2.

Turning to FIG. 3, a diagram illustrating an access sequence to one embodiment of a storage block of the cache subsystem of FIG. 2 is shown. Components corresponding to those shown in FIG. 2 are numbered identically for simplicity and clarity. A storage block 220A is coupled to a tag unit 210A. An exemplary input request sequence to a tag array such as tag array 210 of FIG. 2 is shown. The input requests may be a read or a write to an address 'A' followed by A+32, followed by A+16, followed by A+48. In this example, it is assumed that all four input requests hit in tag unit 210A. As shown in storage block 220A, each of the data segments corresponding to the given addresses is stored in a different sub-block. The columns in the storage block 220A represent sub-blocks 0–3, while the rows are illustrative of the cycle in which the given data segment is accessed.

As described above, tag array 210 of FIG. 2 is fully pipelined. For example, if multiple requests hit within a given tag unit but to a different sub-block, each succeeding request may be processed sequentially and prior to the preceding request being completed. However, accesses to main storage array 220 need not be pipelined if the sequential accesses are to a same sub-block. This is due to a delay associated with writing or reading data from a memory cell or group of cells. Accordingly, any request to a given cell or group of cells (e.g., sub-block) will be followed by a delay before that cell or group of cells may be accessed again.

For the input request sequence given, in cycle 0, data corresponding to address 'A' may be returned or written. In cycle 1, data corresponding to address 'A+32' may be returned or written. In cycle 2, data-corresponding to address 'A+16' may be returned or written. In cycle 3, data corresponding to address 'A+48' may be returned or written. Thus, since the data corresponding to the requested addresses was stored in 4 different sub-blocks, the accesses were returned in 4 sequential cycles with no intervening wait cycles. The resulting output sequence shows no wait cycles between addresses.

As described above, a sequence of requests which hit in one tag unit but which have data stored in the same sub-block may not be serviced in subsequent sequential access cycles with no intervening wait cycles due to the delay associated with accessing a sub-block.

Figure 4:
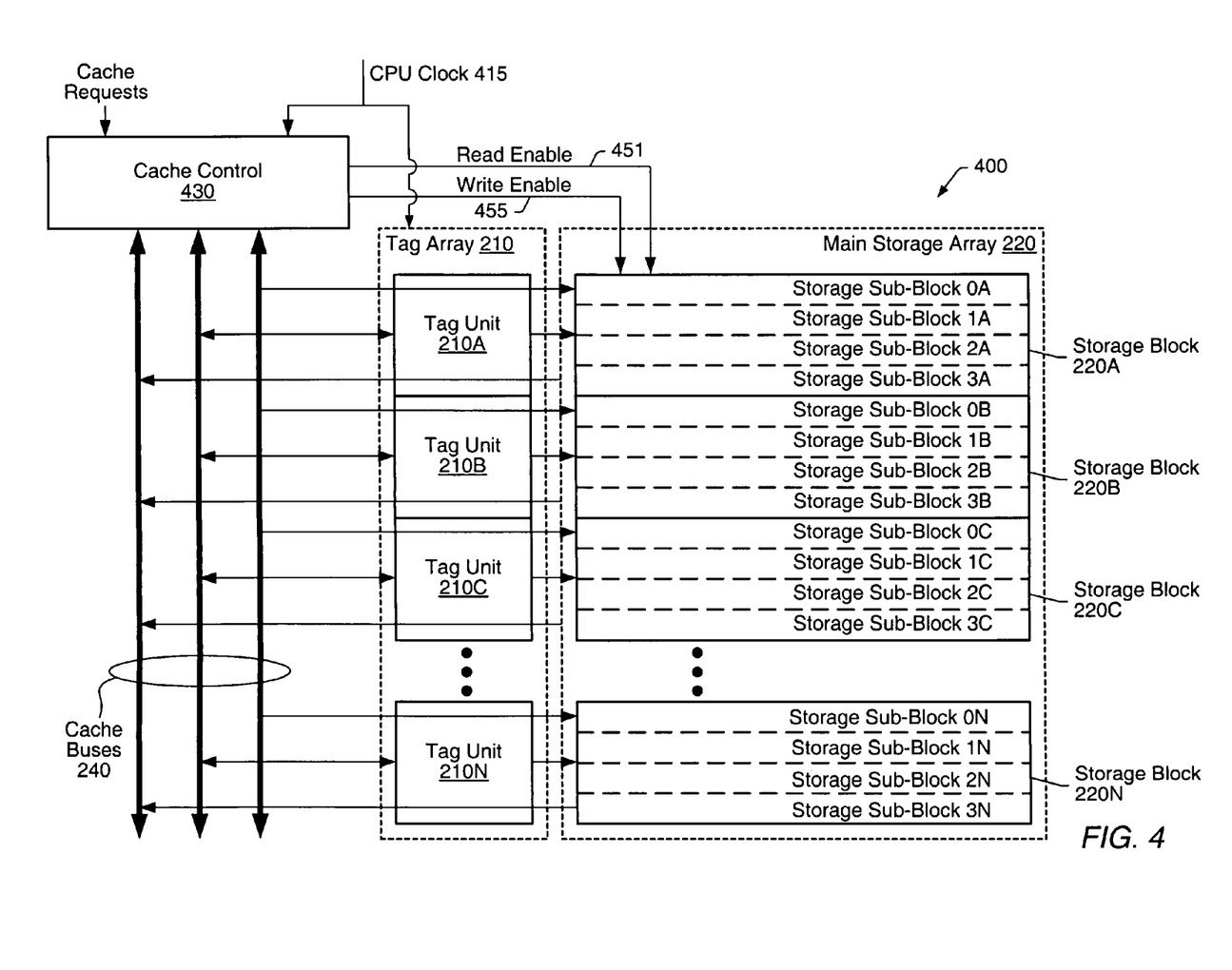
FIG. 4 is a diagram of another embodiment of the cache subsystem of the microprocessor of FIG. 1.

Referring to FIG. 4, a diagram of another embodiment of the cache subsystem of the microprocessor of FIG. 1 is shown. Components corresponding to those shown in FIG. 1–FIG. 3 have been numbered identically for simplicity and clarity. Cache subsystem 400 includes a cache memory including a main storage array 220 coupled to a tag array 210. Further, cache subsystem 400 includes a cache control 430 which is coupled to main storage array 220 via an asynchronous read enable signal 451 and an asynchronous write enable signal 455. Cache control 430 is also coupled to tag array 210 via a plurality of cache access request buses 240. Cache control 430 and tag array 210 each receive a CPU clock signal 415 which may be distributed by the microprocessor clock tree. In one embodiment, main storage array 220 and tag array 210 may be used in an L2 cache subsystem such as L2 cache 130 of FIG. 1, for example. It is noted however, that in other embodiments, main storage array 220 and tag array 210 may be used in any cache subsystem.

Main storage array 220 includes a plurality of memory cells which are arranged into independently accessible storage blocks. In the illustrated embodiment, the storage blocks are designated 220A–220N, where N may be any number of blocks. In one embodiment there may be eight such storage blocks, although in other embodiments other numbers of blocks are contemplated. In addition, each of storage blocks 220A–N includes four independently accessible storage sub-blocks designated sub-blocks 0–3. It is noted that although each of storage blocks 220A–N includes four such sub-blocks, it is contemplated that in other embodiments each of storage blocks 220A–N may include other numbers of sub-blocks. In contrast to some cache arrays which may be accessed synchronously using a CPU or system clock, in the illustrated embodiment, there is no clock distribution network routed to main storage array 220. Main storage array 220 may be accessed asynchronously with respect to tag unit 210 and to the other logic within microprocessor 100. As will be described in greater detail below in conjunction with the descriptions of FIG. 5 and FIG. 6, each respective independently accessible storage sub-block 0–3 may be configured to provide output data in response to receiving an asserted read enable signal 451. In addition, data may be written to a given sub-block in response to receiving an asserted write enable signal 455. Since there is no clock distribution network routed to main storage array 220, there may be no unnecessary power consumption associated with clocking of the unused memory units in the cache array during each cycle.

Tag array 210 is a storage array configured to store cache line tag information. Tag array 210 is arranged into a plurality of tag units, designated 210A–210N, where N is any number of tag units. Each of tag units 210A–N corresponds to a storage block and may include a plurality of tags or 'tag elements'. For example, in the illustrated embodiment, tag unit 210A corresponds to storage block 220A. In addition, each tag element within a given tag unit may correspond to all the storage sub-blocks in a given storage block. Accordingly, a cache line may be stored within a given storage block such that the cache line spans all four storage sub-blocks. For example, in the illustrated embodiment, cache line 225 is stored across storage sub-blocks 0–3 of storage block 220A. In the illustrated embodiment, tag array 210 may be accessed synchronously via CPU clock 415.

Cache control 430 is configured to receive cache access requests from various sources. In one embodiment, cache control 430 and tag array 210 may operate synchronously with the rest of the microprocessor according to CPU clock signal 415. Thus, cache control 430 and tag array 210 may be configured to receive CPU clock signal 415.

In the illustrated embodiment, cache control 430 may be configured to generate read enable signal 451 and write enable signal 455 which may be routed to each of storage sub-blocks 0–3 within each storage block of main storage array 220.

In one embodiment, cache control 430 may be configured to provide an asserted read enable signal 451 and an asserted write enable signal 455 based upon a cache hit or a cache fill request to a particular address within tag array 210. For example, a given read request may hit in tag unit 210A. Tag unit 210A may provide a hit indication (not shown) to cache control 430. Cache control 430 may output a read enable signal 451. In response to read enable signal 451 and the address information from tag unit 210A, a corresponding sub-block may output the requested data after a given delay. Similarly, if a write request corresponding to a hit in tag unit 210A is received, tag unit 210A may provide an indication (not shown) to cache control 430. Cache control 430 may output a write enable signal 455. In response to write enable signal 455 and the address information from tag unit 210A, a corresponding sub-block may be written with the data. In one embodiment, the read and write enable signals may be pulses of a predetermined duration.

In addition, the cache control 430 may be programmable. The programmability feature may allow variable pulse repetition times between each successive read enable signal 451 and between each successive write enable signal 455. Thus, the ability to program the time between successive pulses may allow for process variations and re-use of cache control circuits with different cache array sizes. It is noted that a variety of methods of programming cache control 430 is contemplated. For example, in one embodiment, programmable registers may be used. In another embodiment, the various pulse delay time selections may be hard wired on the die using wire jumpers. During manufacturing, the wire jumper connections may be laser etched to provide the necessary delay.

It is noted that alternative embodiments are contemplated in which logic (not shown) within tag array 210 may generate read enable signal 451 and write enable signal 455.

Figure 5:
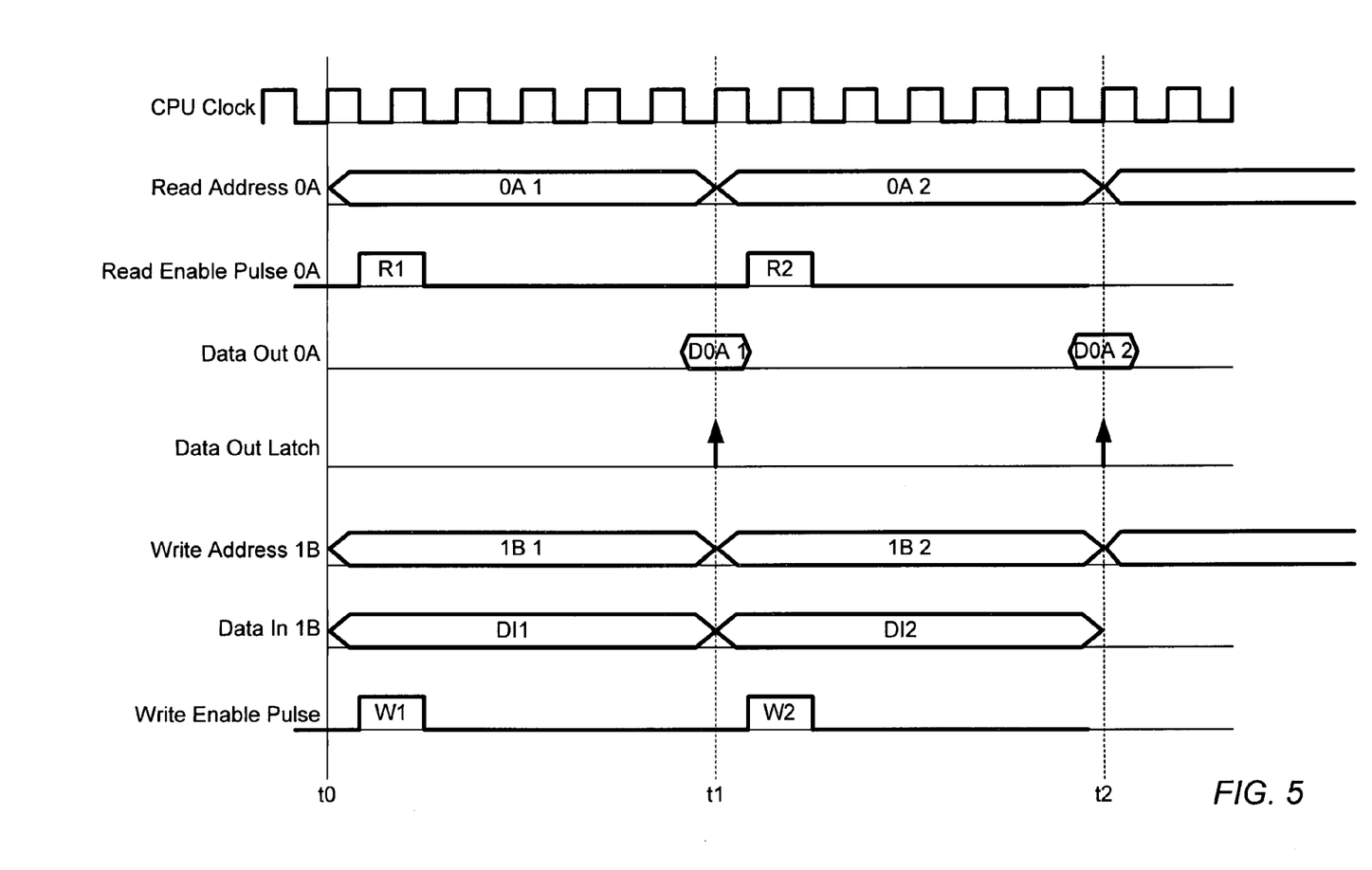
FIG. 5 is a timing diagram illustrating the operation of one embodiment of the cache subsystems of FIG. 2 and FIG. 4.

Turning to FIG. 5, a timing diagram illustrating the operation of one embodiment of the cache subsystems of FIG. 2 and FIG. 4 is shown. This timing diagram includes eight signals, listed from top to bottom: CPU clock, read address 0A, read enable pulse 0A, data out 0A, data out latch, write address 1B, data in 1B and write enable pulse 1B. Referring collectively to FIG. 1 through FIG. 4, the CPU clock signal may be the reference clock for the cache subsystem and is shown in FIG. 4 as CPU clock 415. As described above, the CPU clock signal is distributed to tag units 210 and may not be routed as a distribution network throughout main array 220.

The timing diagram shows one embodiment of a simultaneous read and a concurrently received simultaneous write operation. As described above, the tag array 210 may be fully pipelined, and the main storage array 220 may be pipelined in cases where the accesses are to a different sub-block. However, if simultaneous read or write requests are received by a given tag unit for the same sub-block, cache control 430 may be programmed to output the read and write pulses at the correct time. In addition, access requests to different storage blocks 220A–N of main array 220 may be serviced concurrently. In the following example, two reads to addresses in the same sub-block 0A of storage block 220A and two writes to addresses in the same sub-block 1B of storage block 220B are received. Thus, the reads are to a different tag unit than the writes. It is noted that the specific timing illustrated in FIG. 5 is for discussion purposes and that other embodiments may include other timing.

At timing mark t0, an address 0A1 is presented to storage block 220A, sub-block 0 of main storage array 220. On the falling edge of the same CPU clock pulse, a read enable pulse R1 is asserted for one clock cycle. In response to this first read enable pulse, a block of memory cells within storage block 220A, sub-block 0 may output data DOA 1 after some time delay. In this example, the delay is equivalent to five CPU clock cycles after R1 is asserted. Accordingly, at timing mark t1, a data out latch signal may be asserted to latch data DOA 1. Also at timing mark t0, address 1B1 and data in DI1 are presented to storage block 220B, sub-block 1 of main storage array 220. On the falling edge of the same CPU clock pulse, a write enable pulse W1 is asserted for one clock cycle. In response to this first write enable pulse, the data in DI1 may be written into a block of memory cells within storage block 220B, sub-block 1.

In addition, at timing mark t1 a second address (0A 2) may be provided to storage block 220A, sub-block 0 of main storage array 220. On the next falling edge of the CPU clock after t1, a second read enable pulse R2 is asserted for one clock cycle. In response to this second read enable pulse, a block of memory cells within storage block 220A, sub-block 0 may output data DOA 2 after a time delay equivalent to five CPU clock cycles. At timing mark t2, a second data out latch signal may be asserted to latch the data.

At timing mark t1, a second write address (1B 2) and data in DI2 are provided to storage block 220B, sub-block 1 of main storage array 220. On the next falling edge of the CPU clock after t1, a second write enable pulse W2 is asserted for one clock cycle. In response to this second write enable pulse, a block of memory cells within storage block 220B, sub-block 1 may be written with DI2.

As described above, read cycles and write cycles to the same sub-block may incur wait cycles, but access cycles to different storage blocks may be serviced concurrently or in subsequent sequential cycles. To accommodate these wait cycles, the delay between successive read pulses may programmed. For example, in the above example, cache control 430 may be programmed to output read enable pulses and write enable pulses to the same sub-block no faster than every six CPU clock cycles. It is noted that in one embodiment, the address and data signals may be held long enough for valid data to be read and written.

Figure 6:
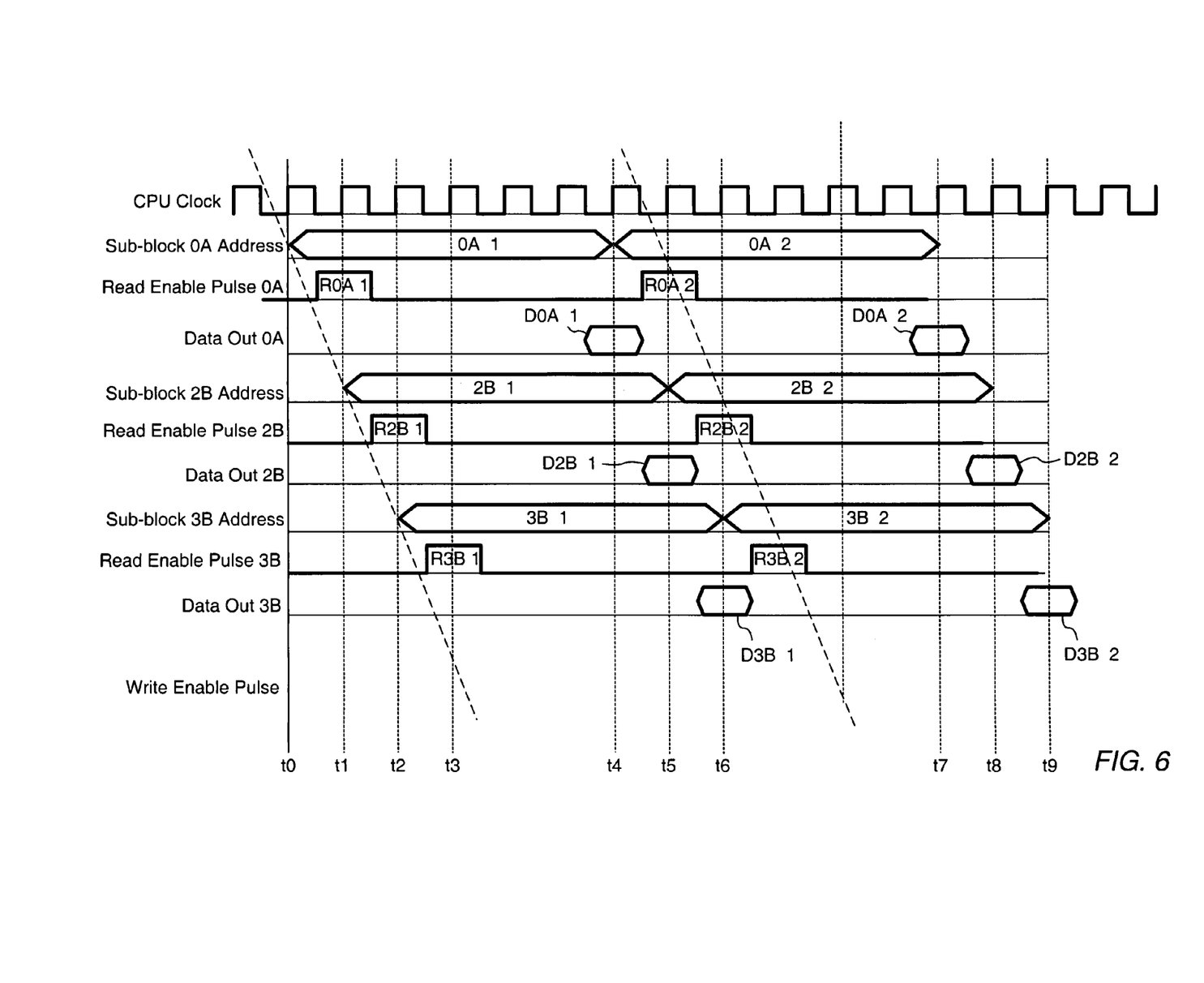
FIG. 6 is a timing diagram illustrating the pipelined operation of the cache subsystems of FIG. 2 and FIG. 4.

Referring to FIG. 6, a timing diagram illustrating the pipelined operation of the cache subsystems of FIG. 2 and FIG. 4 is shown. This timing diagram includes ten signals, listed from top to bottom: CPU clock, sub-block 0A address, read enable pulse 0A, data out 0A, sub-block 2B address, read enable pulse 2B, data out 2B, sub-block 3B address, read enable pulse 3B and data out 3B. Referring collectively to FIG. 1 through FIG. 4, the CPU clock signal may be the reference clock for the cache subsystem and is shown in FIG. 4 as CPU clock 415. As described above, the CPU clock signal is distributed to tag units 210 and may not be routed as a distribution network throughout main array 220.

The timing diagram shows an example of three back-to-back read operations to three different sub-blocks of main storage array 220. As described above, the tag array 210 may be fully pipelined. For example, when multiple back-to-back read or write requests are received by one or more different tag units, the cache subsystem may output data or write data to different sub-blocks during each successive clock cycle, thereby displaying nearly pipelined behavior. It is noted that when back-to-back requests to the same tag unit and the same sub-block in successive cycles are received, the cache subsystem may not display pipelined behavior. In the following example, two reads each to addresses in sub-block 0A of storage block 220A, sub-blocks 2B and 3B of storage block 220B are received back-to-back. It is noted that the specific timing illustrated in FIG. 6 is for discussion purposes and that other embodiments may include other timing.

At timing mark t0, an address 0A 1 is presented to sub-block 0A of main storage array 220. On the falling edge of the first CPU clock pulse, a read enable pulse R0A 1 is asserted for one clock cycle. Since the tag array pipeline is loaded with additional read requests, at timing mark t1, address 2B 1 may be provided to sub-block 2B of main storage array 220. On the next falling edge of the CPU clock after t1, a read enable pulse R2B 1 is asserted for one clock cycle. Further, at timing mark t2, address 2B 1 may be provided to sub-block 2B of main storage array 220 and on the next falling edge of the CPU clock after t2, a read enable pulse R3B 1 is asserted for one clock cycle. Thus, three read requests to three different sub-blocks have been issued.

In response to read enable pulse R0A 1, storage sub-block 0A may output data D0A 1 some time delay later. In this example, the time delay is five CPU clock cycles after R0A 1 is asserted. In response to read enable pulse R2B 1, storage sub-block 2B may output data D2B 1 some time delay later. In this example, the time delay is five CPU clock cycles after R2B 1 is asserted. At timing mark t4, the second address is provided to sub-block 0A of main storage array 220. On the falling edge of the same CPU clock pulse, a read enable pulse R0A 2 is asserted for one clock cycle. In response to read enable pulse R3B 1, storage sub-block 3B may output data D3B 1 some time delay later. In this example, the time delay is five CPU clock cycles after R3B 1 is asserted. At timing mark t5, the second address is provided to sub-block 2B of main storage array 220. On the falling edge of the same CPU clock pulse, a read enable pulse R2B 2 is asserted for one clock cycle. At timing mark t6, the second address is provided to sub-block 3B of main storage array 220. On the falling edge of the same CPU clock pulse, a read enable pulse R3B 2 is asserted for one clock cycle. Thus, at timing marks t4, t5, and t6 the data from the first 3 read operations to three independent sub-blocks 0A, 2B and 3B, respectively is sequentially available.

In response to read enable pulse R0A 2, storage sub-block 0A may output data D0A 2 some time delay later. In this example, the time delay is five CPU clock cycles after R0A 2 is asserted. In response to read enable pulse R2B 2, storage sub-block 2B may output data D2B 2 some time delay later. In this example, the time delay is five CPU clock cycles after R2B 2 is asserted. In response to read enable pulse R3B 2, storage sub-block 3B may output data D3B 2 some time delay later. In this example, the time delay is five CPU clock cycles after R3B 2 is asserted. Thus, at timing marks t7, t8, and t9 the data from the second 3 read operations to the same three independent sub-blocks 0A, 2B and 3B, respectively is sequentially available. It is noted that, the data out from each sub-block may be latched by a latching signal (not shown).

It is noted that although the read and write operations described in conjunction with FIG. 5 and FIG. 6 are described separately, the operations described therein may be performed concurrently. For example, a series of reads and a series of writes may both be pipelined to non-conflicting blocks simultaneously.

Figure 7:
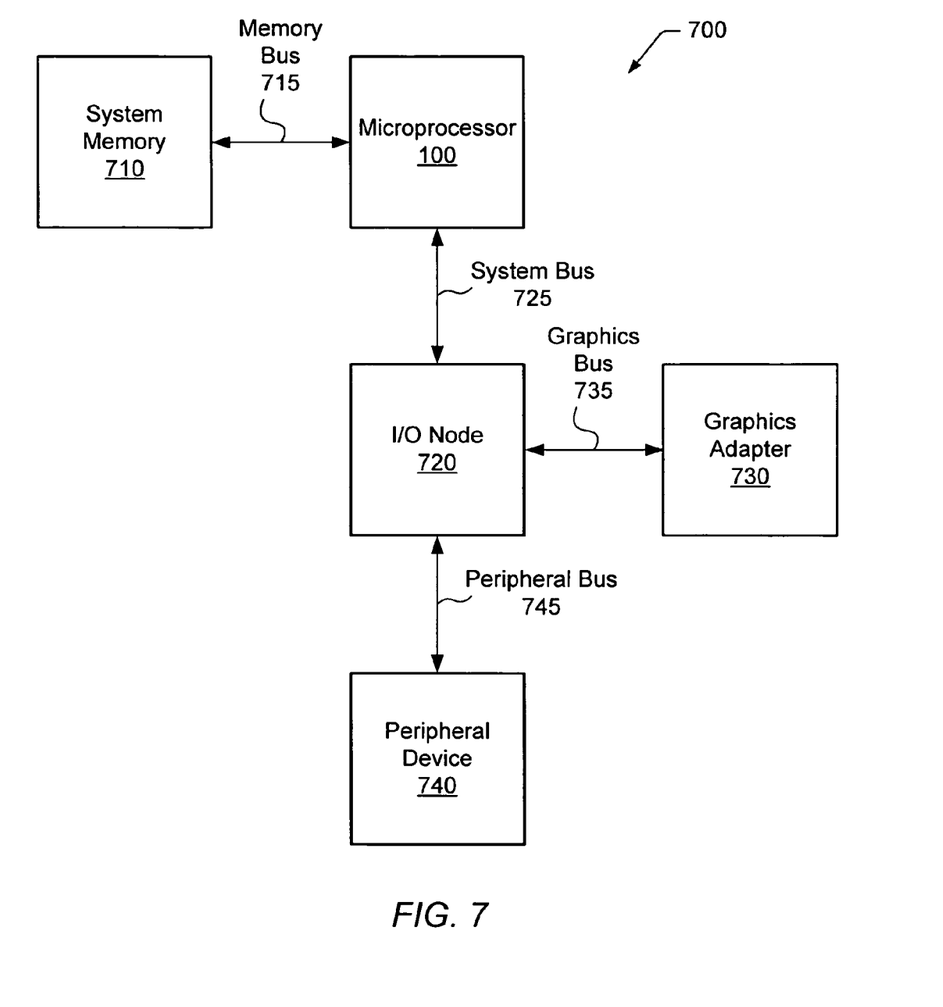
FIG. 7 is a block diagram of one embodiment of a computer system including the microprocessor of FIG. 1.

Referring to FIG. 7, a block diagram of one embodiment of a computer system including the microprocessor of FIG. 1 is shown. Components that correspond to those shown in FIG. 1–FIG. 4 are numbered identically for clarity and simplicity. Computer system 700 includes a microprocessor 100 coupled to a system memory 710 via a memory bus 715. Microprocessor 100 is further coupled to an I/O node 720 via a system bus 725. I/O node 720 is coupled to a graphics adapter 730 via a graphics bus 735. I/O node 720 is also coupled to a peripheral device 740 via a peripheral bus.

In the illustrated embodiment, microprocessor 100 is coupled directly to system memory 710 via memory bus 715. Thus, microprocessor may include a memory interface (not shown in FIG. 7) for controlling accesses to system memory 710. It is noted however that in other embodiments, system memory 710 may be coupled to microprocessor 10 through I/O node 720. In such an embodiment, I/O node 720 may include a memory interface (not shown). Further, in one embodiment, microprocessor 100 may include a cache subsystem such as cache subsystem 200 of FIG. 2. In other embodiments, microprocessor 100 may include a cache subsystem such as cache subsystem 400 of FIG. 4.

System memory 710 may include any suitable memory devices. For example, in one embodiment, system memory may include one or more banks of dynamic random access memory (DRAM) devices. Although it is contemplated that other embodiments may include other memory devices and configurations.

In the illustrated embodiment, I/O node 720 is coupled to a graphics bus 735, a peripheral bus 740 and a system bus 725. Accordingly, I/O node 720 may include a variety of bus interface logic (not shown) which may include buffers and control logic for managing the flow of transactions between the various buses. In one embodiment, system bus 725 may be a packet based interconnect compatible with the Hyper-Transport™ technology. In such an embodiment, I/O node 720 may be configured to handle packet transactions. In alternative embodiments, system bus 725 may be a typical shared bus architecture such as a front-side bus (FSB), for example.

Further, graphics bus 735 may be compatible with accelerated graphics port (AGP) bus technology. In one embodiment, graphics adapter 730 may be any of a variety of graphics devices configured to generate and display graphics images for display. Peripheral bus 745 may be an example of a common peripheral bus such as a peripheral component interconnect (PCI) bus, for example. Peripheral device 740 may any type of peripheral device such as a modem or sound card, for example.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A microprocessor, comprising:
   an execution unit configured to operate on instructions and data;
   a cache memory subsystem coupled to said execution unit;
   wherein said cache memory subsystem includes:
      a cache memory including a plurality of independently accessible storage blocks;
      a plurality of independently accessible tag units coupled to said plurality of storage blocks and configured to store a plurality of tags each including an address tag value;
      a plurality of cache buses coupled to convey a plurality of cache access requests to each of said plurality of storage blocks; and
      a cache controller configured to select said plurality of cache access requests for conveying via said plurality of cache buses;
      wherein said cache controller is further configured to select said plurality of cache access requests such that no cache access conflict exists at any of said plurality of independently accessible tag units; and
      wherein in response to said plurality of cache access requests being conveyed on said plurality of cache buses, different ones of said plurality of storage blocks are concurrently accessible.

2. The microprocessor as recited in claim 1, wherein each of said plurality of storage blocks includes a plurality of independently accessible storage sub-blocks, wherein each of said storage sub-blocks is configured to provide output data in response to receiving an asserted asynchronous read enable signal, and wherein a given one of said storage sub-blocks is configured to store data in response to receiving an asserted asynchronous write enable signal.

3. The microprocessor as recited in claim 1, wherein each of said plurality of tag units corresponds to a different one of said plurality of storage blocks.

4. The microprocessor as recited in claim 1, wherein in response to receiving said plurality of cache access requests, different ones of said plurality of tag units are concurrently accessible.

5. The microprocessor as recited in claim 1, wherein a given tag unit is configured to select one of said plurality of cache access requests if a block bit portion of an address associated with one of said plurality of cache access requests matches a unique assigned value of said given tag unit.

6. The microprocessor as recited in claim 1, wherein said plurality of cache access requests includes a read request, a write request and an update request.

7. The microprocessor as recited in claim 6, wherein said cache controller is further configured to select a given write request dependent upon an already-selected given read request such that said given write request and said given read request do not conflict at any of said plurality of independently accessible tag units.

8. The microprocessor as recited in claim 6, wherein said cache controller is further configured to detennine whether there exists a given pair of read and write requests that do not conflict at any of said plurality of independently accessible tag units, and if said given pair of read and write requests does exist, to select said given pair of read and write requests for conveying via said plurality of cache buses.

9. The microprocessor as recited in claim 1, wherein each of said plurality of storage blocks includes a plurality of independently accessible storage sub-blocks, wherein any two of said sub-blocks associated with different ones of said storage blocks are concurrently accessible and wherein any two of said sub-blocks associated with a same storage block are accessible in successive sequential cycles.

10. The microprocessor as recited in claim 1, wherein said plurality of cache buses includes a read bus, a write bus and an update bus.

11. The microprocessor as recited in claim 1, wherein said cache controller includes a plurality of buffers configured to receive and store said plurality of cache access requests from a plurality of different sources.

12. The microprocessor as recited in claim 11, wherein said plurality of cache access requests includes a read request, a write request and an update request.

13. The microprocessor as recited in claim 12, wherein said cache controller is further configured to select from said plurality of buffers for concurrent conveyance upon said plurality of cache buses, said read request, said write request and said update request, wherein a block bit portion of an address associated with said concurrent read request is different from a block bit portion of an address associated with said concurrent write request.

14. The microprocessor as recited in claim 12, wherein said cache controller is further configured to select from said plurality of buffers for concurrent conveyance upon said plurality of cache buses said read request and said write request dependent upon whether said read request and said write request include a tag value corresponding to a given storage block or a given storage sub-block which is currently accessing a preceding cache access request.

15. The microprocessor as recited in claim 12, wherein said cache controller is further configured to select from said plurality of buffers for concurrent conveyance upon said plurality of cache buses said read request, said write request and said update request, wherein a block bit portion of an address associated with said concurrent read request is the same as a block bit portion of an address associated with said concurrent write request.

16. The microprocessor as recited in claim 12, wherein said cache controller is further configured to receive selected pairs of cache access requests for concurrent conveyance upon said plurality of cache buses, wherein each pair includes a read request and a write request and wherein a block bit portion of an address associated with said concurrent read request is different from a block bit portion of an address associated with said concurrent write request.

17. The microprocessor as recited in claim 1, wherein said cache memory is a level two cache memory.

18. A cache memory subsystem, comprising:
   a cache memory including a plurality of independently accessible storage blocks;
   a plurality of independently accessible tag units coupled to said plurality of storage blocks and configured to store a plurality of tags each including an address tag value;
   a plurality of cache buses coupled to convey a plurality of cache access requests to each of said plurality of storage blocks;
   a cache controller configured to select said plurality of cache access requests for conveying via said plurality of cache buses;
   wherein said cache controller is further configured to select said plurality of cache access requests such that no cache access conflict exists at any of said plurality of independently accessible tag units; and
   wherein in response to said plurality of cache access requests being conveyed on said plurality of cache buses, different ones of said plurality of storage blocks are concurrently accessible.

19. The cache memory subsystem as recited in claim 18, wherein each of said plurality of storage blocks includes a plurality of independently accessible storage sub-blocks, wherein each of said storage sub-blocks is configured to provide output data in response to receiving an asserted asynchronous read enable signal, and wherein a given one of said storage sub-blocks is configured to store data in response to receiving an asserted asynchronous write enable signal.

20. The cache memory subsystem as recited in claim 18, wherein each of said plurality of tag units corresponds to a different one of said plurality of storage blocks.

21. The cache memory subsystem as recited in claim 18, wherein in response to receiving said plurality of cache access requests, different ones of said plurality of tag units are concurrently accessible.

22. The cache memory subsystem as recited in claim 18, wherein a given tag unit is configured to select one of said plurality of cache access requests if a block bit portion of an address associated with one of said plurality of cache access requests matches a unique assigned value of said given tag unit.

23. The cache memory subsystem as recited in claim 18, wherein said plurality of cache access requests includes a read request, a write request and an update request.

24. The cache memory subsystem as recited in claim 23, wherein said cache controller is further configured to select a given write request dependent upon an already-selected given read request such that said given write request and said given read request do not conflict at any of said plurality of independently accessible tag units.

25. The cache memory subsystem as recited in claim 23, wherein said cache controller is further configured to determine whether there exists a given pair of read and write requests that do not conflict at any of said plurality of independently accessible tag units, and if said given pair of read and write requests does exist, to select said given pair of read and write requests for conveying via said plurality of cache buses.

26. The cache memory subsystem as recited in claim 18, wherein each of said plurality of storage blocks includes a plurality of independently accessible storage sub-blocks, wherein any two of said sub-blocks associated with different ones of said storage blocks are concurrently accessible and wherein any two of said sub-blocks associated with a same storage block are accessible in successive sequential cycles.

27. The cache memory subsystem as recited in claim 18, wherein said plurality of cache buses includes a read bus, a write bus and an update bus.

28. The cache memory subsystem as recited in claim 18, wherein said cache controller includes a plurality of buffers configured to receive and store said plurality of cache access requests from a plurality of different sources.

29. The cache memory subsystem as recited in claim 28, wherein said plurality of cache access requests includes a read request, a write request and an update request.

30. The cache memory subsystem as recited in claim 29, wherein said cache controller is further configured to select from said plurality of buffers for concurrent conveyance upon said plurality of cache buses, said read request, said write request and said update request, wherein a block bit portion of an address associated with said concurrent read request is different from a block bit portion of an address associated with said concurrent write request.

31. The cache memory subsystem as recited in claim 29, wherein said cache controller is further configured to select from said plurality of buffers for concurrent conveyance upon said plurality of cache buses said read request and said write request dependent upon whether said read request and said write request include a tag value corresponding to a given storage block or a given storage sub-block which is currently accessing a preceding cache access request.

32. The cache memory subsystem as recited in claim 29, wherein said cache controller is further configured to select from said plurality of buffers for concurrent conveyance upon said plurality of cache buses said read request, said write request and said update request, wherein a block bit portion of an address associated with said concurrent read request is the same as a block bit portion of an address associated with said concurrent write request.

33. The cache memory subsystem as recited in claim 29, wherein said cache controller is further configured to receive selected pairs of cache access requests for concurrent conveyance upon said plurality of cache buses, wherein each pair includes a read request and a write request and wherein a block bit portion of an address associated with said concurrent read request is different from a block bit portion of an address associated with said concurrent write request.

34. The cache memory subsystem as recited in claim 18, wherein said cache memory is a level two cache memory.

35. A computer system, comprising:
   a system memory configured to store instructions and data;
   a microprocessor coupled to said system memory via a memory bus;

wherein said microprocessor includes:
an execution unit configured to operate on said instructions and data;
a cache memory subsystem coupled to said execution unit and configured to store said instructions and data for execution by said execution unit;
wherein said cache memory subsystem includes:
a cache memory including a plurality of independently accessible storage blocks;
a plurality of independently accessible tag units coupled to said plurality of storage blocks and configured to store a plurality of tags each including an address tag value;
a plurality of cache buses coupled to convey a plurality of cache access requests to each of said plurality of storage blocks; and
a cache controller configured to select said plurality of cache access requests for conveying via said plurality of cache buses;
wherein said cache controller is further configured to select said plurality of cache access requests such that no cache access conflict exists at any of said plurality of independently accessible tag units; and
wherein in response to said plurality of cache access requests being conveyed on said plurality of cache buses, different ones of said plurality of storage blocks are concurrently accessible.

36. The computer system as recited in claim 35, wherein each of said plurality of storage blocks includes a plurality of independently accessible storage sub-blocks, wherein each of said storage sub-blocks is configured to provide output data in response to receiving an asserted asynchronous read enable signal, and wherein a given one of said storage sub-blocks is configured to store data in response to receiving an asserted asynchronous write enable signal.

37. The computer system as recited in claim 35, wherein each of said plurality of tag units corresponds to a different one of said plurality of storage blocks.

38. The computer system as recited in claim 35, wherein in response to receiving said plurality of cache access requests, different ones of said plurality of tag units are concurrently accessible.

39. The computer system as recited in claim 35, wherein a given tag unit is configured to select one of said plurality of cache access requests if a block bit portion of an address associated with one of said plurality of cache access requests matches a unique assigned value of said given tag unit.

40. The computer system as recited in claim 35, wherein said plurality of cache access requests includes a read request, a write request and an update request.

41. The computer system as recited in claim 40, wherein said cache controller is further configured to select a given write request dependent upon an already-selected given read request such that said given write request and said given read request do not conflict at any of said plurality of independently accessible tag units.

42. The computer system as recited in claim 40, wherein said cache controller is further configured to determine whether there exists a given pair of read and write requests that do not conflict at any of said plurality of independently accessible tag units, and if said given pair of read and write requests does exist, to select said given pair of read and write requests for conveying via said plurality of cache buses.

43. The computer system as recited in claim 35, wherein each of said plurality of storage blocks includes a plurality of independently accessible storage sub- blocks, wherein any two of said sub-blocks associated with different ones of said storage blocks are concurrently accessible and wherein any two of said sub-blocks associated with a same storage block are accessible in successive sequential cycles.

44. The computer system as recited in claim 35, wherein said plurality of cache buses includes a read bus, a write bus and an update bus.

45. The computer system as recited in claim 35, wherein said cache controller includes a plurality of buffers configured to receive and store said plurality of cache access requests from a plurality of different sources.

46. The computer system as recited in claim 45, wherein said plurality of cache access requests includes a read request, a write request and an update request.

47. The computer system as recited in claim 46, wherein said cache controller is further configured to select from said plurality of buffers for concurrent conveyance upon said plurality of cache buses, said read request, said write request and said update request, wherein a block bit portion of an address associated with said concurrent read request is different from a block bit portion of an address associated with said concurrent write request.

48. The computer system as recited in claim 46, wherein said cache controller is further configured to select from said plurality of buffers for concurrent conveyance upon said plurality of cache buses said read request and said write request dependent upon whether said read request and said write request include a tag value corresponding to a given storage block or a given storage sub-block which is currently accessing a preceding cache access request.

49. The computer system as recited in claim 46, wherein said cache controller is further configured to select from said plurality of buffers for concurrent conveyance upon said plurality of cache buses said read request, said write request and said update request, wherein a block bit portion of an address associated with said concurrent read request is the same as a block bit portion of an address associated with said concurrent write request.

50. The computer system as recited in claim 46, wherein said cache controller is further configured to receive selected pairs of cache access requests for concurrent conveyance upon said plurality of cache buses, wherein each pair includes a read request and a write request and wherein a block bit portion of an address associated with said concurrent read request is different from a block bit portion of an address associated with said concurrent write request.

51. The computer system as recited in claim 35, wherein said cache memory is a level two cache memory.

* * * * *